Sept 10, 1957  J. W. GREENE  2,805,582
PULLEY AND METHOD OF MANUFACTURE
Filed July 8, 1954  3 Sheets-Sheet 1

INVENTOR.
John W. Greene
BY
HIS ATTORNEYS

Sept 10, 1957  J. W. GREENE  2,805,582
PULLEY AND METHOD OF MANUFACTURE
Filed July 8, 1954  3 Sheets-Sheet 2

INVENTOR.
John W. Greene
BY *Weff, Mackey & Burden*
HIS ATTORNEYS

Sept 10, 1957 J. W. GREENE 2,805,582
PULLEY AND METHOD OF MANUFACTURE
Filed July 8, 1954 3 Sheets-Sheet 3

INVENTOR.
John W. Greene
BY
HIS ATTORNEYS

United States Patent Office 2,805,582
Patented Sept. 10, 1957

2,805,582

PULLEY AND METHOD OF MANUFACTURE

John W. Greene, Youngstown, Ohio, assignor to Metallon Products, Inc., Canfield, Ohio, a corporation of Ohio Application July 8, 1954, Serial No. 442,100

7 Claims. (Cl. 74—230.8)

This invention relates to a pulley and a method of forming it and, more particularly, to a pulley made directly from strip stock by ordinary forming dies.

Pulleys in the past have either been cast or made from sheet metal. Such pulleys usually have a solid flange or spokes disposed in the same plane which extend from the hub of the pulley to its periphery. When used in such installations as domestic furnace blowers, ventilating fans, and the like, these pulleys adversely affect the flow of air and produce pulsating sound waves when a belt enters a groove of the pulley. Such pulleys are said to create a "diaphragm effect."

Additionally, an important requirement for pulleys, and particularly those used at high speeds, is a very accurate and constant radius from the axis of the hub of the pulley to all points of the periphery. An accurate and constant radius throughout 360 degrees of revolution has not been realized in prior pulleys except by expensive and time-consuming operations, such as machining and grinding. As a result, many prior pulleys appreciably vibrate, and a belt in passing about the pulley produces a slapping sound. These annoying vibrations make the pulley unacceptable for use in ventilating fans, refrigerators, and the like, where the noise echoes throughout adjoining rooms.

Moreover, pulleys constructed from sheet metal have been either spun on a lathe to form the flanges or stamped in two separate parts, each part having a flange. The two parts were then secured together as by spot welding. Such techniques are also expensive and time-consuming.

My pulley is free of the foregoing objections. Air is easily passed through the present pulley in an axial direction. My pulley is also readily formed directly from strip stock with a very accurate and constant radius by ordinary blanking and forming dies and rolls. In one form, my pulley includes a peripheral groove having one side thereof folded back and terminating in spokes which are disposed inwardly toward the center. The ends of the spoke define an opening in which a hub is fixed. Such a pulley may be made by crimping the corner of a cup-shaped blank to form a flange. By selectively punching out portions of the base of the blank suitable spokes are formed, the free ends of which may be welded to a hub. A groove is then formed from the walls of the blank adjacent the flange.

The accompanying drawings illustrate a presently preferred embodiment of the pulley and various steps in its formation:

Figure 4:
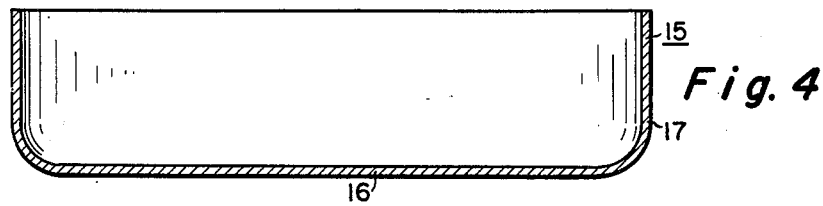
Figure 4 is a center, longitudinal section of a cup-shaped blank from which my pulley is formed.

The nature and construction of the pulley will be apparent from a description of the method by which it is formed. A piece of strip stock is initially stamped to provide a substantially flat disc. The disc is drawn to form a cup-shaped blank 15 shown in Figure 4. The blank has a base 16 and cylindrical walls 17 extending therefrom.

Figure 5:
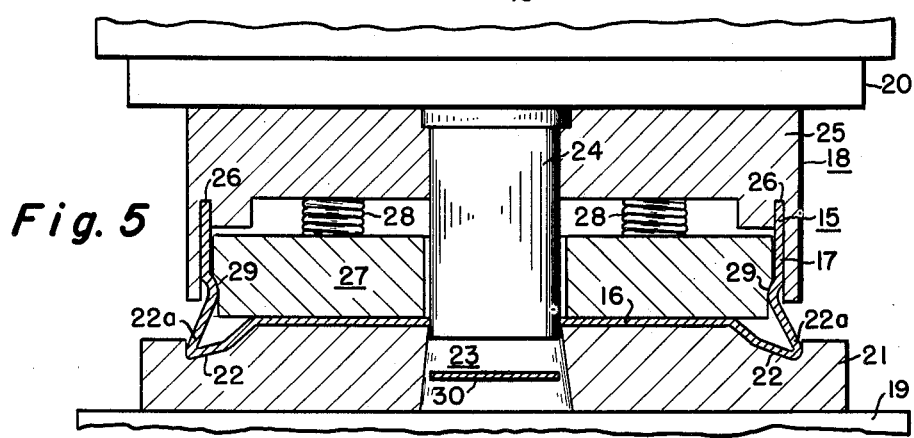
Figure 5 is a center, longitudinal section of a stamping press illustrating the formation of a flange at the corner of the blank.
Figure 6:
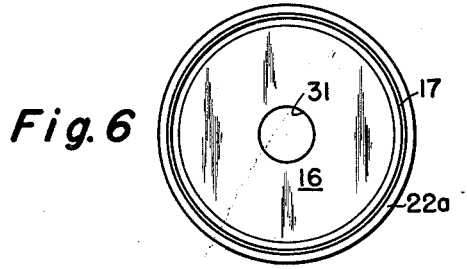
Figure 6 is a plan view of the blank as it is shown in Figure 5 after that operation.
Figure 8:
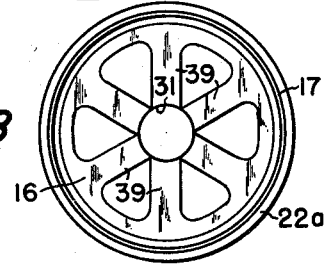
Figure 8 is a plan view of the blank as it is shown in Figure 7 after that operation.

The next step is to form a flange around the blank substantially where the base and walls meet. Preferably, at this time a center opening is also punched from the base 16. As shown in Figure 5, these operations are accomplished by a stamping press 18 including a die holder 19 and a punch holder 20. The die holder has a die 21 provided with an annular groove 22 and a center opening 23. The punch holder 20 carries a punch 24 and a forming block 25. The block has an annular slot 26 and resiliently supports a forming ring 27 by springs 28. The ring 27 has a circumferential groove 29. In operation, the base 16 is laid over the die 21, and the walls 17 of the cup-shaped blank 15 are placed to engage the slot 26, as the punch holder 20 descends. The punch 24 enters the opening 23 stamping out the portion 30 to form an opening 31 in the base. The forming block 25 forces the corner of the blank 15 into the annular groove 22, thereby depressing the base 16 inwardly as shown. The outermost part of the groove 22 extends beyond the slot 26 in a radial direction away from the punch 24. Consequently, after the base of the blank has been forced into the groove 22 to its outermost part, the upward and downward forces of the die 21 and block 25, respectively, produce a couple which forces the walls 17 to buckle radially inwardly. The circumferential groove 29 receives the walls at this time to impart the desired shape and form the flange 22a.

Figure 7:
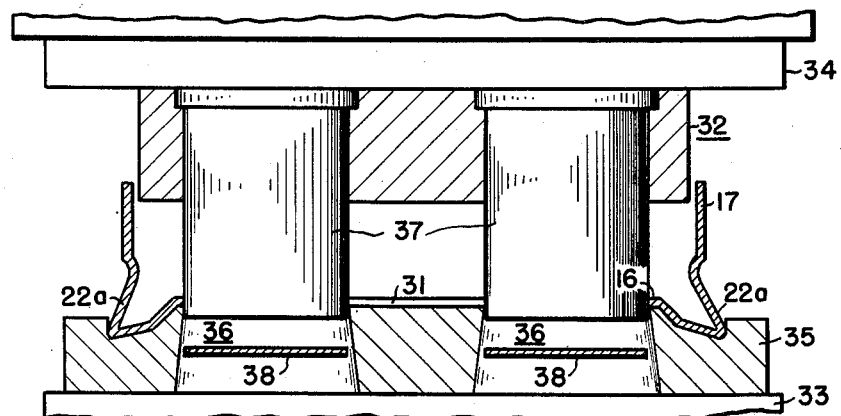
Figure 7 is a center, longitudinal section of a stamping press illustrating a punching operation which forms the spokes.

The blank 15 is now punched to form spokes. As shown in Figure 7, a similar stamping press 32 is used and includes a die holder 33 and a punch holder 34. The die 35 is similar in contour to die 21 so that it may readily receive the blank after the previous step. However, die 35 has, in the embodiment shown, six pie-shaped openings 36 radially disposed about the die. The punch holder 34 has six punches 37 which register with the openings 36, so that upon lowering the punch holder 34, portions 38 are stamped from the base 16. The portions of the base left between the stampings 38 take the form of spokes 39.

Figures 1, 2, 3:
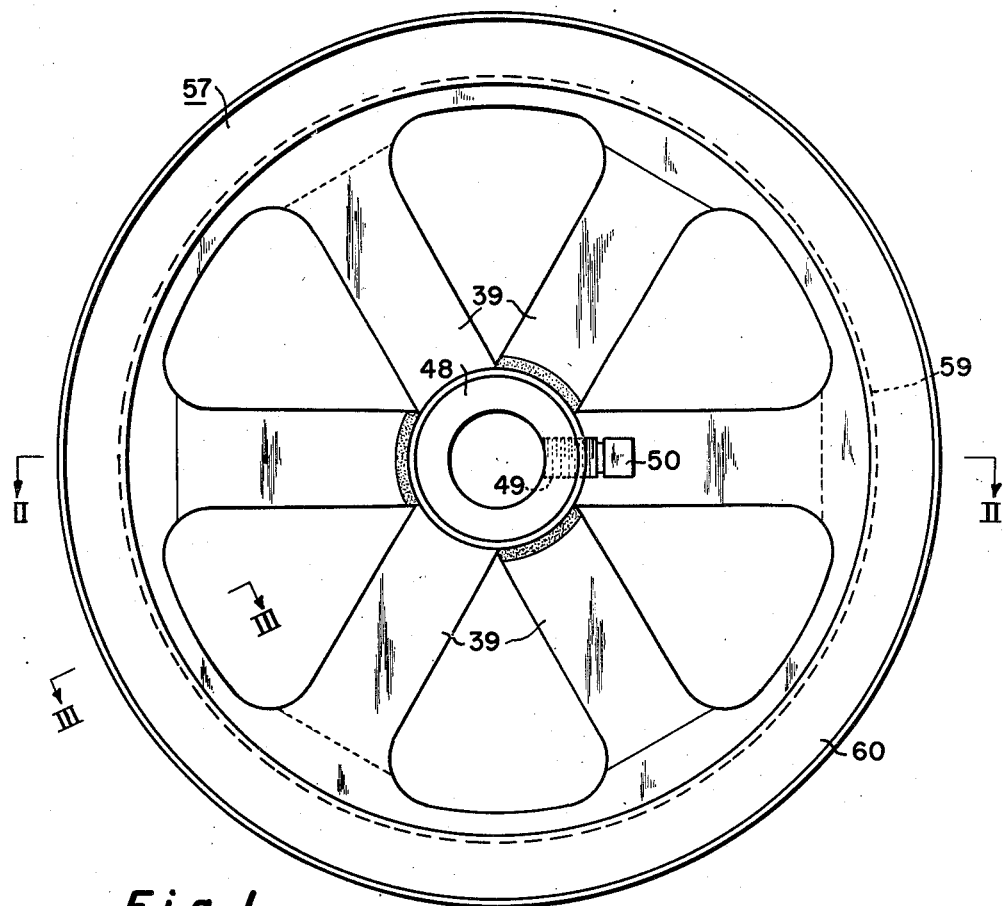
Figure 1 is a front view of my pulley.
Figures 2 and 3 are sections of Figure 1 on the lines II—II and III—III, respectively.
Figure 9:
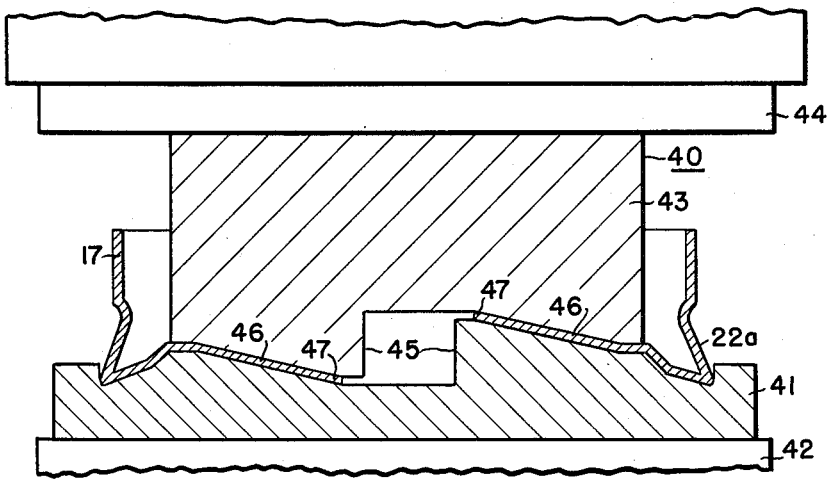
Figure 9 is a center, longitudinal section of a stamping press illustrating the offsetting of the spokes.
Figure 10:
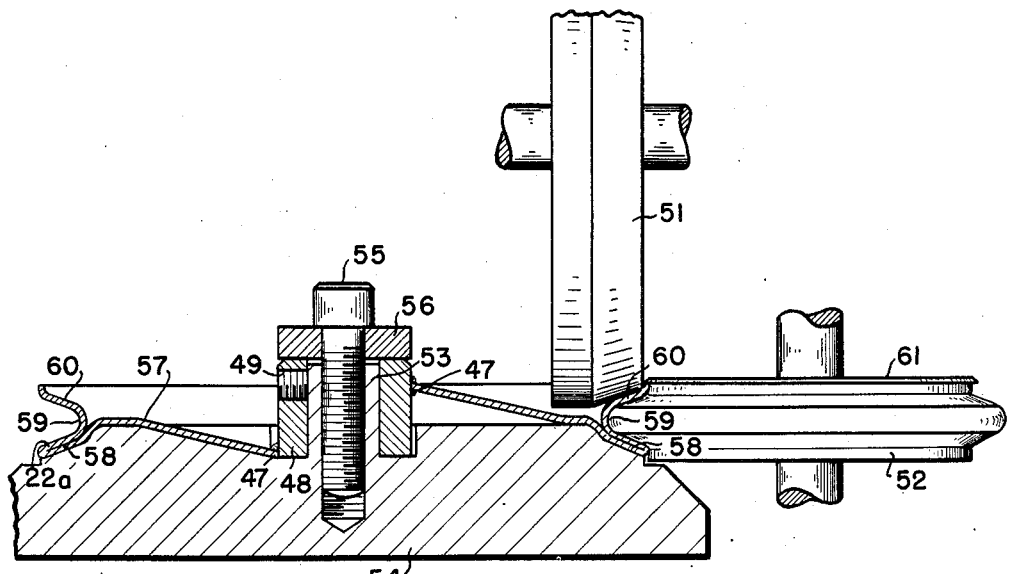
Figure 10 is a center, longitudinal section of a plate and accompanying rollers illustrating the forming of the groove and trimming of the excess portion of the walls of the blank.

To avoid the fault of prior pulleys which create a "diaphragm effect," the spokes 39 are at least partially moved from the plane of the base. Figure 9 illustrates another stamping press 40 for this purpose. Both the die 41 of the die holder 42 and the punch 43 of the punch holder 44 have alternating hump portions 45 and flat portions 46, a hump portion of one engaging a flat portion of the other. In this manner, as the punch holder 44 descends, the inner ends 47 of contiguous spokes are forced in opposite directions with respect to the axis of the pulley. Preferably, the inner ends 47 are forced apart a distance measured along the axis of the pulley which substantially corresponds to the over-all width of the groove formed later. A hub 48 may now be welded to the inner ends 47 adjacent the ends of the hub as shown in Figures 2 and 10. The hub preferably has a threaded opening 49 to receive a set screw 50.

The blank is now ready for the final step of finishing the formation of the peripheral groove. Since the design of the hub 48 and spokes 46 is such that maximum strength and rigidity are extended to the periphery of the pulley, it is possible to form the groove by the use of forming rolls 51 and 52 placed at right angles to each other. As shown in Figure 10, for this operation the pulley is mounted over an arbor 53, which fits within the hub 48, and against a plate 54 having a surface contour which matches that of the pulley and especially the contour of the folded side of the groove to be formed as hereinafter explained. A bolt 55, received by the arbor 53 and a collar 56 hold the pulley 57 firmly in place. With the rolls in the positions shown in Figure 10, plate 54 is rotated about the center axis of the hub 48. This action bends the upper portion of the walls 17 toward the flange 22a whereby a groove is formed between the flange and the bent walls. More particularly, roll 52 folds the two legs of the flange 22a against each other to form one side 58 of a groove 59. Roll 52 also simultaneously determines the depth of the groove. At the same time, roll 51 bends the wall around the periphery of roll 52 to form another side 60 of the groove in symmetry with side 58. It is emphasized that in this manner the radius of the pulley from the hub to the bottom of the groove is accurately and positively controlled and is, therefore, always constant. Preferably, roll 52 has a cutting disc 61 which trims off the unused part of the walls.

Many advantages are realized from the present pulley and its method of manufacture. The creation of the spokes as continuations of the original metal stamping which forms the groove 59 results in a very rigid structural support for the groove which is not found in conventional metal pulleys having a stamped flange. This feature also permits the use of an inexpensive straight bushing as a hub rather than the usual stepped diameter type having a shoulder to locate the web of the flange radially as well as axially. The angular relation of the spokes with respect to each other also permits the maximum amount of air to pass through the pulley in an axial direction. Accordingly, the present pulley is fully acceptable for use with ventilating fans, furnace blowers, and the like.

The present pulley is easily fabricated from a single piece of strip stock by the use of conventional blanking and drawing dies. The use of forming rolls as described automatically provides a high degree of accuracy in placing the groove 59 in a true plane completely around the pulley. The forming rolls further locate the groove concentrically with the bore of the hub 48 to a closer tolerance than is possible with any other method except those which are prohibitive in cost from a production standpoint, such as machining or grinding. Further by rolling the groove 59 as described, a groove of much greater strength is realized than is possible in other types of pulleys. The use of forming rolls also has an advantage over the use of dies in this operation in that the forming rolls may be adjustably mounted in slides to accommodate a full range of pulley diameters. The groove size can also be changed by simply changing the forming rolls, as desired. The use of dies for this operation would require a different size of die for each diameter of pulley and for each groove size.

As exemplary of the gauges of sheet stock which may be used, 20 gauge up to 12 gauge may be formed without difficulty.

While the foregoing disclosure describes a presently preferred embodiment, it is understood that the invention may be practiced in other forms within the scope of the following claims.

I claim:

1. A method of forming a pulley from a cup-shaped blank having a base and walls extending therefrom including depressing the base inwardly urging the walls of the blank radially inwardly adjacent the base whereby said depressing and urging form a circular flange at the corner of the blank, removing a portion from the center of the base to form an opening, removing additional portions from the base to form spoke members which extend radially inwardly from the periphery of the base and terminate at the periphery of said opening, bodily deflecting the spoke members from opposite sides of the base to swing their terminals into permanently set positions alternating with one another at opposite sides of the base, fixing a hub member to the terminal portions of the spoke members, and urging the walls of the blank toward the flange whereby a groove is formed between the flange and the walls.

2. A method of forming a pulley from a single disc including drawing the disc to form a cup-shaped blank having a base and walls extending therefrom, depressing the base inwardly coextensively of its surface up to a point adjacent its periphery, forcing the walls of the blank radially inwardly adjacent the base whereby said depressing and forcing form a circular flange substantially where the base and walls meet, punching a circular portion from the center of the base to form an opening, punching additional portions from the base to form spoke members which are fixed at one end to the periphery of the base and extend radially inwardly terminating at the periphery of said opening, bodily deflecting the spoke members from opposite sides of the base to cause their terminals to swing and spread to a predetermined width apart in alteration with one another at the opposite sides of the base, fixing a hub member to the terminal portions of the spoke members, and bending the walls of the blank to a point spaced opposite from the flange by a distance equal to the width of spread of the spoke terminals whereby a groove of that width is formed between the flange and the walls.

3. A method of forming a V-belt pulley from a single disc from a piece of strip stock including punching the disc from the strip, drawing the disc to form a cup-shaped blank having a base and cylindrical walls extending therefrom, depressing the base inwardly coextensively of its surface up to a point adjacent its periphery, forcing the walls of the blank radially inwardly adjacent the base whereby said depressing and forcing form a circular flange substantially where the base and walls meet which extends around the blank, punching a circular portion from the center of the base to form an opening, punching additional portions from the base to form spoke members which are integral at one end with the periphery of the base and which have free ends extending radially inwardly to form the circumference of said opening, bending the free inner ends of contiguous spoke members from the plane of the depressed base in opposite directions, inserting a hub in said opening and welding it to the tips of the free ends of said spoke members, and bending the upper portion of the walls of the blank toward the flange whereby a groove is formed between the flange and the bent walls.

4. A method of forming a V-belt pulley from a single disc from a piece of strip stock including punching the disc from the strip, drawing the disc to form a cup-shaped blank having a base and cylindrical walls extending therefrom, depressing the base inwardly coextensively of its surface up to a point adjacent its periphery, forcing the walls of the blank radially inwardly adjacent the base whereby said depressing and forcing form a circular flange substantially where the base and walls meet which extends completely around the blank, punching a circular portion from the center of the base to form an opening, punching additional portions from the base to form spoke members which are integral at one end with the periphery of the base and have free ends which extend radially inwardly to form the circumference of said opening, bending the free inner ends of contiguous spoke members from the plane of the depressed base in opposite directions, inserting a hub in said opening, welding the tips of the inner ends of said spoke members to the hub adjacent the ends thereof, bending the upper portion of the walls of the blank toward the flange whereby a groove is formed between the flange and the bent walls, and trimming away the upper portion of the walls on that side of the groove.

5. A method of forming a V-belt pulley from a single disc from a piece of strip stock including punching the disc from the strip, drawing the disc to form a cup-shaped blank having a base and cylindrical walls extending therefrom, a depressing the base inwardly coextensively of its surface up to a point adjacent its periphery, crimping the walls of the blank radially inwardly adjacent the base whereby said depressing and crimping form a circular flange substantially where the base and walls meet which extends completely around the blank, punching a circular portion from the center of the base to form an opening, punching additional portions from the base to form spoke members which are integral at one end with the periphery of the base and have free ends which extend radially inwardly to form the circumference of said opening, bending the inner ends of contiguous spoke members from the plane of the depressed base in opposite directions, inserting a hub in said opening, welding the tips of the inner ends of said spoke members to the hub adjacent the ends thereof, rolling a groove in the walls of the blank adjacent the flange whereby a groove is formed between the flange and the bent walls, and trimming away the upper portion of the walls on that side of the groove.

6. A pulley including a V-shaped peripheral trough having one side folded back on itself, the fold extending from a lip of the trough along said side to substantially the center of the bottom of the trough and terminating in spaced-apart spokes, said spokes extending radially inwardly from the trough a sufficient distance whereby the inner ends of the spokes define a center opening, the inner ends of contiguous spokes being spread apart in opposite directions with respect to the axis of the pulley, and a substantially smooth preformed hub in the opening welded at its outer periphery to said inner ends and defining a hub opening within and smaller than said center opening.

7. A pulley including a V-shaped peripheral trough having one side folded back on itself, the fold extending from a lip of the trough along said side to substantially the center of the bottom of the trough and terminating in spaced apart spokes, said spokes extending radially inwardly from the trough and having their inner ends disposed about a center opening, the inner ends of adjacent spokes being spread apart in opposite directions an axial distance substantially equal to the overall width of the trough, and a substantially smooth preformed hub in the opening welded at its outer periphery to said inner ends and defining a hub opening within and smaller than said center opening.

References Cited in the file of this patent

UNITED STATES PATENTS

| | | |
|---|---|---|
| 429,407 | Avery | June 3, 1890 |
| 429,408 | Avery | June 3, 1890 |
| 1,031,907 | Bowen | July 9, 1912 |
| 1,728,002 | Nelson | Sept. 10, 1929 |
| 2,641,935 | Wilken | June 16, 1953 |